United States Patent
Knebel et al.

(10) Patent No.: US 7,442,922 B2
(45) Date of Patent: Oct. 28, 2008

(54) METHOD FOR LOCALLY HIGHLY RESOLVED, MASS-SPECTROSCOPIC CHARACTERIZATION OF SURFACES USING SCANNING PROBE TECHNOLOGY

(75) Inventors: Detlef Knebel, Berlin (DE); Matthias Amrein, Calgary (CA); Klaus Dreisewerd, Münster (DE)

(73) Assignee: JPK Instruments AG, Berlin (DE)

( * ) Notice: Subject to any disclaimer, the term of this patent is extended or adjusted under 35 U.S.C. 154(b) by 291 days.

(21) Appl. No.: 10/521,563

(22) PCT Filed: Jul. 24, 2003

(86) PCT No.: PCT/DE03/02493

§ 371 (c)(1),
(2), (4) Date: Aug. 1, 2005

(87) PCT Pub. No.: WO2004/017019

PCT Pub. Date: Feb. 26, 2004

(65) Prior Publication Data

US 2006/0097164 A1 May 11, 2006

(30) Foreign Application Priority Data

Jul. 24, 2002 (DE) ............................... 102 34 507

(51) Int. Cl.
*G21K 7/00* (2006.01)
(52) U.S. Cl. .................... 250/306; 250/309; 250/311; 250/288; 250/282; 250/310; 977/863; 977/860; 977/849; 977/360; 356/73
(58) Field of Classification Search .......... 250/309, 250/423 F, 307, 288, 306, 287, 282, 310, 250/311; 73/104–105; 977/860, 863, 849; 356/73
See application file for complete search history.

(56) References Cited

U.S. PATENT DOCUMENTS

| 5,278,406 | A | | 1/1994 | Kinoshita |
| 5,440,122 | A | * | 8/1995 | Yasutake ................. 250/443.1 |
| 5,440,124 | A | * | 8/1995 | Kelly et al. ................. 250/309 |
| 5,444,260 | A | * | 8/1995 | Kazmerski ............... 250/492.3 |
| 6,080,586 | A | * | 6/2000 | Baldeschwieler et al. ... 436/173 |

(Continued)

FOREIGN PATENT DOCUMENTS

EP 0 596 494 A 5/1994

(Continued)

*Primary Examiner*—Jack I. Berman
*Assistant Examiner*—Michael J Logie
(74) *Attorney, Agent, or Firm*—Smith Patent Office

(57) ABSTRACT

The invention relates to a combined method in which a high-resolution image of a sample surface is recorded by means of scanning force microscopy and the locally high-resolution, chemical nature (which is correlated with this) of the sample surface is measured by means of mass spectroscopy. The surface is chemically analyzed on the basis of laser desorption of a restricted surface area. For this purpose, the surface is illuminated in a pulsed form at each point of interest using the optical near-field principle. The optical near-field principle guarantees analysis with a position resolution which is not diffraction-limited. A hollow tip of the measurement probe that is used allows unambiguous association between the chemical analysis and a selected surface area. The highly symmetrical arrangement allows good transmission of the molecular ions that are produced.

20 Claims, 2 Drawing Sheets

U.S. PATENT DOCUMENTS

| | | |
|---|---|---|
| 6,405,137 B1 | 6/2002 | Reading |
| 6,466,309 B1 * | 10/2002 | Kossakovski et al. ......... 356/73 |
| 6,566,653 B1 * | 5/2003 | Gerber et al. ............... 250/288 |
| 6,580,069 B1 * | 6/2003 | Cerezo ....................... 250/287 |
| 6,875,981 B2 * | 4/2005 | Nishikawa ................. 250/306 |
| 2002/0172943 A1 * | 11/2002 | Henderson et al. ............. 435/5 |
| 2003/0066962 A1 * | 4/2003 | Kaito et al. ................. 250/306 |
| 2003/0134273 A1 * | 7/2003 | Henderson ..................... 435/5 |
| 2004/0033679 A1 * | 2/2004 | Jacobson et al. ............ 438/510 |
| 2004/0051037 A1 * | 3/2004 | Taylor et al. ................ 250/288 |

FOREIGN PATENT DOCUMENTS

| | | |
|---|---|---|
| JP | 8-94646 A | 4/1996 |
| JP | 2000283909 A * | 10/2000 |

* cited by examiner

METHOD FOR LOCALLY HIGHLY RESOLVED, MASS-SPECTROSCOPIC CHARACTERIZATION OF SURFACES USING SCANNING PROBE TECHNOLOGY

The present invention relates to a method for high-resolution microscopic observation of the surface structure, and at the same time of the molecular composition associated with the observed structure elements, of a sample surface. The invention also relates to an apparatus having a specially adapted scanning force microscope and a specially adapted mass spectrometer for carrying out the method.

A scanning force microscope (SFM) scans the surface structure of a sample to be examined, by means of a piezoelectric mechanism. The mechanism can be moved not only on the sample plane (x/y direction) but also at right angles to it in the z direction. First of all, the sample is moved into contact with a tip by moving it in the z direction. The tip is located at the free end of a cantilever which is clamped in at one end. The cantilever typically has a length of between 10 μm and 500 μm, and the tip is ideally atomically sharp. The cantilever and tip are generally integrated and, in most commercial products at the moment, are composed of silicon or silicon nitride. The bending of the cantilever as a result of the force between the sample and the tip is normally measured by means of the optical pointer principle, and is set to a desired (nominal) value.

In the so-called contact mode, an image of the sample surface is obtained as follows: while a section of the sample surface is being scanned, any further bending of the cantilever resulting from the sample topology is fed back to the nominal value. The setting of the scanning unit in the z direction as a function of each point on the x/y plane reflects the sample topology, and is recorded.

In the so-called intermittent contact mode, the cantilever is caused to oscillate close to its mechanical resonant frequency before being moved towards the sample. After being moved towards the sample, the tip then touches the sample briefly on one occasion in each oscillation cycle. This leads to attenuation of the oscillation and thus to a reduced oscillation amplitude, which is measured and is set to a specific value as a measure of the intensity of the interaction between the sample and the tip. The sample surface is now imaged as described above.

Time-of-flight (TOF) mass spectroscopy is used to examine the molecular composition of an analyte on the basis of the molecular masses of the components. The elements of a sample to be examined are changed from the solid phase to the gas phase in different ways in a vacuum system. By way of example, one sample region is bombarded with a laser pulse for this purpose. In the process, charged molecules or molecule fragments which are accelerated by means of electrodes in a flight tube from which the air has been removed strike a detector after a flight path of, for example, 60 to 100 cm. The molecular weight is calculated from the time of flight: the heavier the molecule, the longer is the time of flight. This method is highly sensitive and accurate; only subpeco molar quantities are required. In principle, it is technically possible to detect individual ions in a TOF arrangement. The error is around ±0.05 Da per 1000 Da.

The primary aim of scanning force microscopy is to allow the state of the sample surface to be assessed by imaging the structure. If the preconditions are ideal, the atomic structure of a sample surface can be resolved. This applies to surface of crystalline structures and, to a restricted extent, to high-order organic and inorganic adsorbates on surfaces. In this situations, the state of the sample surface can be assessed directly.

However, depending on the sample, the resolution is generally not achieved, and the topography does not provide sufficient information to make an assessment of the state of a sample surface. In these situations, it is necessary to identify the local chemical nature or the local molecular composition of a sample surface by means other than microscopic structure analysis. This statement relates not only to scanning force microscopy but also to every other microscopic method (electron microscopy, optical microscopy, etc.). Methods are therefore used which combine microscopic imaging with chemical analysis, in the wide or narrow sense. The following text describes two methods which are related to the method according to the method and are based on local ablation of the surface, followed by mass spectroscopy.

In laser disorption mass spectrometry (LAMMA), a laser pulse is focused onto a sample point chosen by means of conventional optical microscopy. This leads to local ablation of the sample and to the production of molecule ions from the locally ablated material. The ions are accelerated in the electrical field and are identified on the basis of their molecular mass by means of a time of flight mass spectrometer. One arrangement from LAMMA (LAMMA 2000; Spengler B. and Hubert, M.: Scanning Microprobe Matrix-Assisted Laser Desorption Ionization (SMALDI) Mass Spectrometry: Instrumentation for Sub-Micrometer Resolved LDI and MALDI Surface Analysis, J. Soc. Mass. Spectrom. 13, 735-748, 2002) should be mentioned in particular, in which the described principle has been optimized for combined imaging of the structure by means of confocal optical microscopy and local molecular composition by means of mass spectrometer of samples. In this arrangement, both the optical resolution and the minimum sample region from which ions can be obtained and detected are diffraction-limited. An optical and analytical resolution of 0.5 μm has been achieved in practice, that is to say the minimum analyzed sample region had a diameter of 0.5 μm.

Time-of-flight secondary ion mass spectrometry (TOF-SIMS) is one analytical method for locally resolved chemical characteristic of material surfaces of an inorganic, organic and biological nature. The method is based on time-resolved recording of secondary ions which are produced by bombardment of the surface with high-imaging primary ions (Cs+, Ga+). In this case, the primary ion beam is highly focused and is scanned over the sample. The secondary ions released during the process are accelerated into the flight tube of a TOF mass spectrometer. Since the effective verification depth is only about 1 nanometer, the measured mass spectrum is composed only of the chemical components from the uppermost molecular layers. The lateral resolution of the ion images is about 1 micrometer.

The methods as described above for locally resolved chemical characterization of a sample surface vary with respect to the minimum analyzed sample region within the resolution range of conventional optical microscopy. This is inadequate for many requirements in medicine, engineering and science. By way of example, cell membranes are laterally organized in a complex manner. In this case, so-called lipid rafts represent the functional units of a large number of membrane-bound processes. Their diameter is about 60 nanometers. Analysis of their individual composition will be of critical importance for complete understanding of the membrane-bound processes that have been mentioned.

The combination of structured imaging in the nanometer range with mass spectroscopy with corresponding position resolution promises an answer to the requirements that have been mentioned, and to a large number of other requirements.

A combination of a scanning probe technique (for example, SFM) with mass spectroscopy may be used for this purpose. In fact, so far, the option of combination of mass spectroscopy with high-resolution scanning force microscopy has been investigated in different ways by different authorities. Either sample material has been deliberately ablated by lateral injection of pulsed laser light into the gap between the sample and the SFM tip, or pulsed laser light has been used to illuminate the sample, in the form of a pulse, through a glass fiber with a conical tip in a so-called aperture (SNOM (scanning near-field optical microscope). Both strategies make use of the principle of near-field optics, that is to say the tip is used to produce an illumination spot which is considerably smaller than the smallest possible diameter of an illumination spot produced by conventional optics.

This has made it possible to reproducibly produce holes with a diameter of a few nanometers. In both cases, ions that were produced were sucked out laterally from the tip region. However, surprisingly, it has not so far been possible to achieve an unambiguous association between ions and a defined region in the near field of the tip. This problem is a result of the ions being sucked out inefficiently from the near field of the tip and sample. Our own experimental investigations and model calculations have confirmed the unsatisfactory finding: the transmission of ions that are produced into the flight tube of a mass spectrometer is poor and is dependent in a manner which cannot be calculated on the geometric conditions immediately at the point at which the ions are produced.

In summary, universal chemical analysis of surfaces with a position resolution in the nanometer range has not yet been available.

The object of the invention is to specify an improved method and an improved apparatus in which ions are produced in a very small volume in the near field of a tip/sample region which can be selected by the scanning force microscope, and are passed on with a high transmission level for mass spectrometry.

According to the invention, the object is achieved by an apparatus as claimed in the independent claim 1, and by a method as claimed in the independent claim 7.

According to one aspect, a method is provided in which a scanning force microscope is operated with a cantilever with an integrated hollow tip. The hollow tip has a small aperture opening on the sample side. The aperture preferably has a diameter which is considerably smaller than the wavelength of the light that is used. An illumination spot is thus produced on the sample on the basis of the principle of near-field optics, with a diameter which is considerably less than the diffraction-limited illumination spot of conventional optics. The hole in the tip widens increasingly towards the rear side, where it has its largest opening.

In particular, the method (i) allows an unambiguous association between all the observed ions and a defined sample region; (ii) association of the observed ions with the sample topology; and (iii) local resolution, both of the topology and of the local molecular composition, below the resolution limit of conventional optical systems.

Scanning force microscopy is preferably carried out conventionally, as described above, using the intermittent contact mode or the contact mode. The microscopy is preferably carried out in a hard vacuum. As an alternative to scanning force microscopy, it is also feasible to adapt other scanning probe techniques for use in the described method.

The locally resolved mass spectroscopy is carried out in parallel with or following the SFM imaging. In this case, the tip is in contact with the sample, or is in the immediate near field of the sample. For mass spectroscopy, a laser pulse is injected into the hollow tip from the rear side. Material is ablated from the sample at each desired point on the sample by means of a short laser pulse, and is passed on for mass spectroscopy. For this purpose, the opening in the rear of the tip is actually connected to a flight tube, which is at a suitable electrical potential relative to the tip and to the sample, and is used for electrically sucking out the molecular ions which are produced after a laser pulse. The ions then preferably fly into a time of flight mass spectroscopy. Further advantages and expedient developments of the invention will become evident from the following description of exemplary embodiments and with reference to the drawing, in which:

Figure 1A:
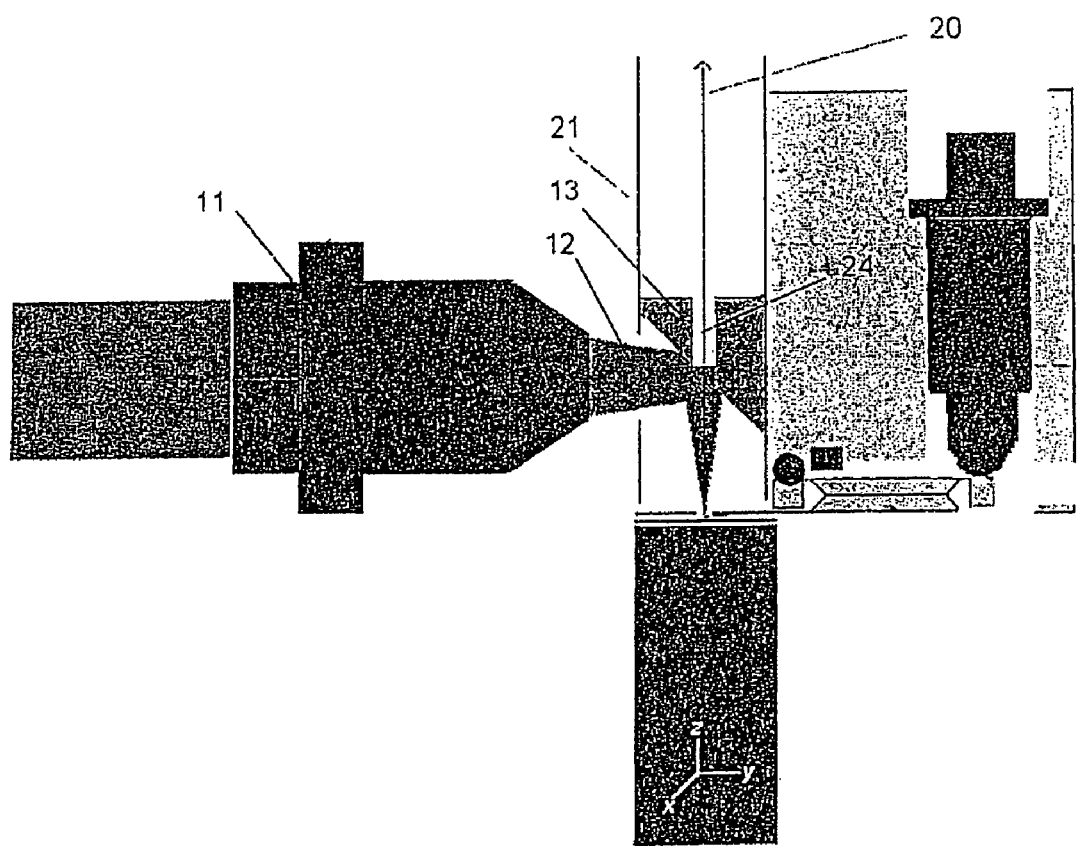
FIG. 1A shows a schematic illustration in order to explain a method based on one embodiment, showing a cross section through an arrangement with a scanning unit, a sample, a cantilever with a hollow tip, a flight tube and an objective.

FIGS. 1A, 1B, 2A and 2B show schematic illustrations in order to explain two embodiments of the method for locally high-resolution, mass-spectroscopic characterization of surfaces by means of a scanning probe technique. In both embodiments, scanning force microscopy is combined with the capability to ablate surface material from the sample at any point x, y, and carry out mass-spectroscopic analysis of ionized sample material. This is done by using a cantilever 1 with a tip 2 with an axial, conical hole through it. The hole opens with a defined aperture at the apex 3 of the tip.

The aperture is used as an outlet opening for a focused laser pulse 10 onto the sample 30, and as an inlet opening for molecular ions 20 which are produced after a laser pulse in the area of the illuminated sample region.

The sample is generally illuminated coaxially with respect to the longitudinal axis of the tip, through the hole in it. The ions are preferably likewise extracted coaxially with respect to the tip, and through the hole. For extraction, the flight tube 21 is connected to an electrical potential relative to the sample. An electrical field is formed, largely axially symmetrically with respect to the flight tube/tip axis. The field penetrates the hole in the tip and leads to extraction of the ions. If the flight tube is at a relatively low potential, ions with a positive total charge are extracted, and vice versa. The high degree of axial symmetry of the arrangement and thus of the field leads to largely axial extraction and to axial flight of the ions. Additional ion optics in the flight tube (not illustrated) are used to pass back ions which do not fly exactly axially.

The area from which the material is ablated is governed by the size of the aperture in the hollow tip. The aperture diameter is typically considerably less than the wavelength of the light that is used.

Figure 1B:
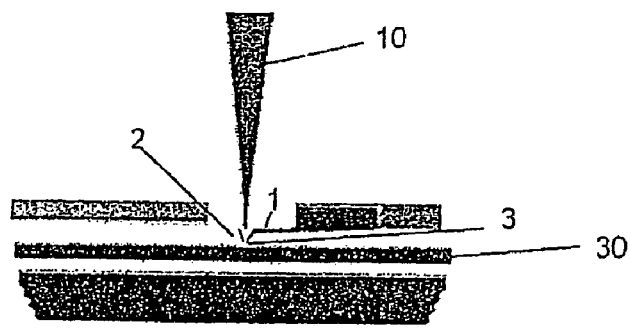
FIG. 1B shows an enlarged illustration of a section of an arrangement shown in FIG. 1A.

The embodiments in FIGS. 1A, 1B and 2A, 2B differ in how the laser light is injected: in the embodiment shown in FIGS. 1A and 1B, an objective 11 is located at the side, alongside the flight tube, for focusing. The optical axis 12 is initially at right angles to the axis of the flight tube 21. The light enters the flight tube via a window, is deflected in the axial direction by means of a mirror 13, and is focused in the hole in the tip. The mirror has a central hole 24 for the ions to pass through.

Figure 2A:
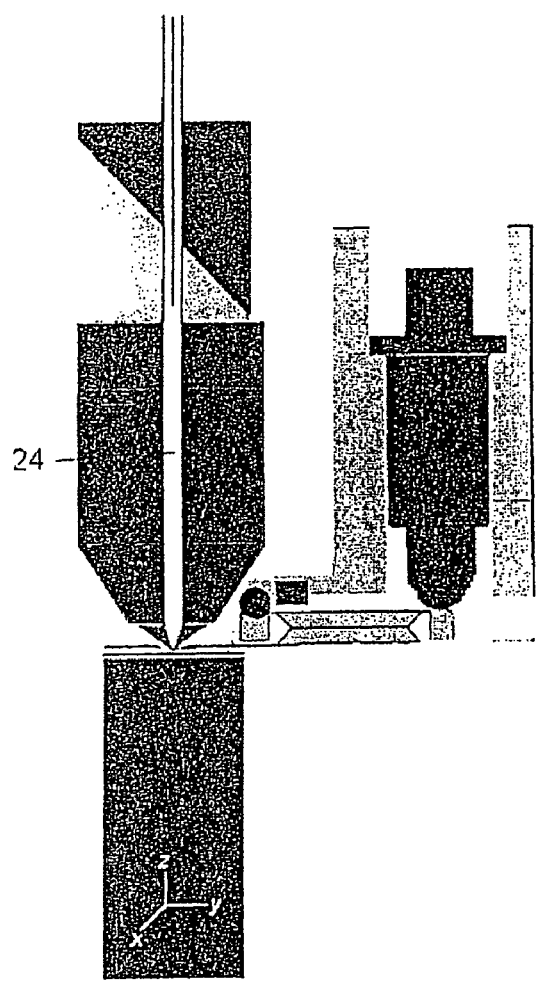
FIG. 2A shows a schematic illustration in order to explain a method based on a further embodiment, showing a cross section through an arrangement with a scanning unit, a sample, a cantilever with a hollow tip, a flight tube and an objective.
Figure 2B:
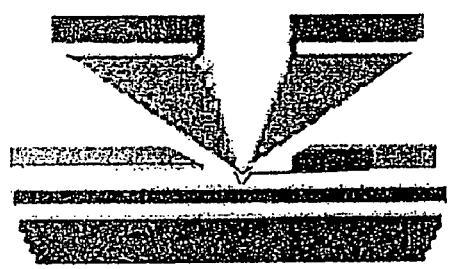
FIG. 2B shows an enlarged illustration of a section of the arrangement shown in FIG. 2A.

In the embodiment shown in FIGS. 2A and 2B, the objective is coaxial with respect to the flight tube. The flight tube is introduced into a central hole 24 in the objective. Collimated laser light is reflected into the beam path downstream from the objective. In this case as well, the mirror has a central hole 5 for the ions to pass through.

The features of the invention as disclosed in the present description, in the claims and in the drawing may be significant to the implementation of the various embodiments of the invention both individually and in any given combination.

The invention claimed is:

1. An apparatus for a scanning microscope, in particular a scanning force microscope, comprising a measurement probe which defines a near field, and having a scanning unit which allows the measurement probe to move relative to a sample in all three spatial directions, in conjunction with a mass spectrometer with an ionization unit, an extraction unit and an analysis unit, wherein the measurement probe has a hollow tip so that the near field of the measurement probe can be used by the ionization unit in such a way that ions are formed only in the near field of the measurement probe, and the shape of the measurement probe allows an essentially axially symmetrical field distribution of the extraction unit with respect to the axis of the analysis unit.

2. The apparatus as claimed in claim 1, wherein the measurement probe is a cantilever.

3. The apparatus as claimed in claim 1, wherein the sample can be moved in all three spatial directions by means of the scanning unit.

4. The apparatus as claimed in claim 1, wherein the ionization unit has a laser, light beams which are indicated by the laser are focused off-axis and are then deflected by means of a mirror in an axial direction, with the mirror having an axial hole which allows the ions to pass through to the analysis unit.

5. The apparatus as claimed in claim 1, wherein the ionization unit has a laser, and light beams which are indicated by the laser are deflected by means of a mirror in an axial direction and are then focused by means of a focusing device, with the mirror and the focusing device each having an axial hole which allows the ions to pass through to the analysis unit.

6. The apparatus as claimed in claim 1, wherein the ionization unit has a laser, and light beams which are indicated by the laser are passed to the measurement probe and cause ionization in the near field of the measurement probe by means of field amplification.

7. A method for high-resolution examination of a measurement sample using a combined scanning probe microscope, in particular a scanning force microscope, wherein the scanning probe microscope is first of all used to record an image of the measurement sample, in particular of the topography of the measurement sample, and wherein a mass spectrometer is then used for destructive, chemical characterization of at least subareas of sections of the measurement sample which are covered by the image, wherein the information from scanning probe microscopy and from mass spectrometry can be compared with high lateral resolution.

8. The method as claimed in claim 7, wherein the selected areas are chosen successively such that the entire area imaged by the scanning probe microscope is analyzed, thus additionally resulting in a chemical image of the sample.

9. The method as claimed in claim 7, wherein further ablation of the measurement sample leads to high-resolution depth information.

10. The method as claimed in claim 7, wherein the distance between two points for ionization can be chosen by analysis of the area ablated by an ionization process, such that this leads to uniform ablation of the measurement sample.

11. An apparatus for a scanning microscope, comprising a measurement probe which defines a near field and a scanning unit which allows the measurement probe to move relative to a sample in all three spatial directions in conjunction with a mass spectrometer with an ionization unit, an extraction unit and an analysis unit, wherein the measurement probe has a hollow tip so that the near field of the measurement probe can be used by the ionization unit such that ions are formed only in the near field of the measurement probe, and a shape of the measurement probe allows an essentially axially symmetrical field distribution of the extraction unit with respect to an axis of the analysis unit.

12. The apparatus as claimed in claim 11, wherein the measurement probe is a cantilever.

13. The apparatus as claimed in claim 11, wherein the sample can be moved in all three spatial directions by means of the scanning unit.

14. The apparatus as claimed in claim 11, wherein the ionization unit has a laser, and light beams from the laser are focused off-axis and are then deflected by means of a mirror in an axial direction, the mirror having an axial hole which allows the ions to pass through to the analysis unit.

15. The apparatus as claimed in claim 11, wherein the ionization unit has a laser, and light beams from the laser are deflected by means of a mirror in an axial direction and are then focused by means of a focusing device, the mirror and the focusing device each having an axial hole which allows the ions to pass through to the analysis unit.

16. The apparatus as claimed in claim 11, wherein the ionization unit has a laser, and light beams from the laser are passed to the measurement probe and cause ionization in the near field of the measurement probe by means of field amplification.

17. A method for high-resolution examination of a measurement sample using a combined scanning probe microscope, comprising the steps of:

using the scanning probe microscope to record an image of the measurement sample; and using a mass spectrometer for destructive, chemical characterization of at least subareas of sections of the measurement sample which are covered by the image; and further comprising a step of comparing information from the scanning probe microscope and from the mass spectrometer with high lateral resolution.

18. The method as claimed in claim 17, further comprising a step of selecting areas successively such that an entire area imaged by the scanning probe microscope is analyzed, thus additionally resulting in a chemical image of the measurement sample.

19. The method as claimed in claim 17, further comprising a step of ablating the measurement sample, leading to high-resolution depth information.

20. The method as claimed in claim 19, further comprising a step of choosing a distance between two points for ionization by analysis of an area following said step of ablation, resulting in uniform ablation of the measurement sample.

* * * * *